(12) United States Patent
Bittner et al.

(10) Patent No.: US 9,884,609 B2
(45) Date of Patent: Feb. 6, 2018

(54) RATCHETING WEB TIGHTENING APPARATUS FOR A MULTI-POINT MOTOR VEHICLE SEAT RESTRAINT SYSTEM

(71) Applicant: Indiana Mills & Manufacturing, Inc., Westfield, IN (US)

(72) Inventors: Douglas W. Bittner, Indianapolis, IN (US); Jacob C. White, Tucson, AZ (US)

(73) Assignee: Indiana Mills & Manufacturing, Inc., Westfeld, IN (US)

( * ) Notice: Subject to any disclaimer, the term of this patent is extended or adjusted under 35 U.S.C. 154(b) by 0 days.

(21) Appl. No.: 15/349,126

(22) Filed: Nov. 11, 2016

(65) Prior Publication Data

US 2017/0129451 A1 May 11, 2017

Related U.S. Application Data

(60) Provisional application No. 62/254,176, filed on Nov. 11, 2015.

(51) Int. Cl.
| | |
|---|---|
| *B60R 22/00* | (2006.01) |
| *B60R 22/46* | (2006.01) |
| *B60R 22/34* | (2006.01) |
| *B60R 22/26* | (2006.01) |
| *B60R 22/02* | (2006.01) |

(52) U.S. Cl.
CPC .............. *B60R 22/34* (2013.01); *B60R 22/26* (2013.01); *B60R 2022/027* (2013.01)

(58) Field of Classification Search
CPC .... B60R 22/34; B60R 22/26; B60R 2022/027
USPC ................ 297/468, 474, 475, 476, 479, 484
See application file for complete search history.

(56) References Cited

U.S. PATENT DOCUMENTS

| | | | | |
|---|---|---|---|---|
| 3,694,029 | A | * | 9/1972 | Noble .................... B64D 25/06 297/467 |
| 6,076,894 | A | * | 6/2000 | Busch .................... B60R 22/26 297/475 |
| 6,309,024 | B1 | * | 10/2001 | Busch .................... B60R 22/00 24/170 |
| 6,773,075 | B2 | * | 8/2004 | Rouhana ................. B60R 22/26 242/378.4 |
| 6,817,629 | B2 | * | 11/2004 | Herberg .................. B60R 22/02 280/801.1 |
| 6,824,222 | B2 | * | 11/2004 | Maloney ............. B60R 22/1855 297/478 |

(Continued)

*Primary Examiner* — Rodney B White
(74) *Attorney, Agent, or Firm* — Barnes & Thornburg LLP (57) ABSTRACT

A web tightening apparatus is disclosed for a multi-point restraint harness having a web extendable about an occupant of a motor vehicle seat. A base frame is mounted between the seat and a floor of a motor vehicle, a web turning guide is mounted to and within the base frame with the web extending into the base frame and through the web turning guide, a ratcheting device is mounted to the base frame and has a handle, and a ratcheting web is coupled at one end to the web extending from the web turning guide and coupled at an opposite end to the ratcheting device. The ratcheting device is responsive to ratcheting actuation of the handle to draw the ratcheting web therein, wherein movement of the ratcheting web into the ratcheting device draws the web further into the base frame and thereby tightens the web about the occupant.

20 Claims, 7 Drawing Sheets

(56) References Cited

U.S. PATENT DOCUMENTS

| | | | | |
|---|---|---|---|---|
| 7,011,341 B2* | 3/2006 | Herberg | ............ | B60R 22/02 242/378.4 |
| 7,201,399 B2* | 4/2007 | Frank | ............ | B60R 22/02 280/801.1 |
| 7,625,048 B2* | 12/2009 | Rouhana | ............ | B60R 22/02 297/484 |
| 8,469,400 B2* | 6/2013 | Merrill | ............ | B60N 2/24 280/801.1 |
| 8,469,401 B2* | 6/2013 | Humbert | ............ | B60N 2/24 280/801.1 |
| 8,783,782 B2* | 7/2014 | Park | ............ | B60N 2/688 297/475 |
| 9,554,625 B2* | 1/2017 | Latuszek | ............ | B60R 22/347 |
| 2004/0251675 A1* | 12/2004 | Herberg | ............ | B60R 22/02 280/806 |
| 2005/0073187 A1* | 4/2005 | Frank | ............ | B60R 22/02 297/484 |
| 2013/0200195 A1* | 8/2013 | Ono | ............ | B60R 22/34 242/382 |

* cited by examiner

RATCHETING WEB TIGHTENING APPARATUS FOR A MULTI-POINT MOTOR VEHICLE SEAT RESTRAINT SYSTEM

CROSS-REFERENCE TO RELATED APPLICATION

This patent application claims the benefit of, and priority to, U.S. Provisional Patent Application Ser. No. 62/254,176, filed Nov. 11, 2015, the disclosure of which is incorporated herein by reference.

FIELD OF THE INVENTION

The present invention relates generally to occupant restraint systems for motor vehicles, and more specifically to such restraint systems which include at least one ratcheting web tightening feature.

BACKGROUND

Various occupant restraint systems are used to restrain motor vehicle operators and/or occupants. Such restraint systems typically include multiple "points" of securement; that is, such restraint systems may typically be secured at multiple locations to one or more support structures, e.g., via a plurality of restraint webs. Some such restraint systems may include various mechanisms for tightening, i.e., taking up slack in, one or more such restraint webs.

SUMMARY

The present invention may comprise one or more of the features recited in the attached claims, and/or one or more of the following features and combinations thereof. In one aspect, a web tightening apparatus is provided for a multi-point occupant restraint harness carried by a motor vehicle seat mounted within a motor vehicle, the occupant restraint harness including a first web configured to extend at least partially about a first portion of the occupant. The web tightening apparatus may comprise a base frame configured to be mounted to at least two of a seat bottom of the motor vehicle seat, a seat mounting base and a floor of the motor vehicle, a first web turning guide mounted to and within the base frame, the first web of the multi-point occupant restraint harness extending into the base frame and through the first web turning guide within the base frame, a first ratcheting device mounted to the base frame and having a first handle, and a first ratcheting web coupled at one end within the base frame to the first web extending from the first web turning guide and coupled at an opposite end to the first ratcheting device, the first ratcheting device responsive to ratcheting actuation of the first handle to draw the first ratcheting web therein. Movement of the first ratcheting web into the first ratcheting device draws the first web further into the base frame and thereby tightens the first web about the first portion of the occupant.

In another aspect, a web tightening apparatus is provided for a multi-point occupant restraint harness carried by a motor vehicle seat mounted within a motor vehicle, the occupant restraint harness including a first web attached at opposite ends thereof to the occupant restraint harness, the first web configured to extend about a first portion of the occupant. The web tightening apparatus may comprise a base frame configured to be mounted to at least two of a seat bottom of the motor vehicle seat, a seat mounting base and a floor of the motor vehicle, wherein a portion of the first web between the opposite ends thereof extends into the base frame through a first slot defined on one side thereof and extends out of the base frame through a second slot defined on an opposite side thereof, a first ratcheting device mounted to the base frame and having a first handle, and a first ratcheting web coupled at one end within the base frame to the first web and coupled at an opposite end to the first ratcheting device, the first ratcheting device responsive to ratcheting actuation of the first handle to draw the first ratcheting web therein, wherein movement of the first ratcheting web into the first ratcheting device draws the first web further into the base frame and thereby tightens the first web about the first portion of the occupant.

In a further aspect, a web tightening apparatus is provided for a multi-point occupant restraint harness carried by a motor vehicle seat mounted within a motor vehicle, the occupant restraint harness including first and second webs each attached at opposite ends thereof to the occupant restraint harness, the first web configured to extend about a first portion of the occupant and the second web configured to extend about a second portion of the occupant. The web tightening apparatus may comprise a base frame configured to be mounted between a seat bottom of the motor vehicle seat and a floor of the motor vehicle, wherein a portion of each of the first and second webs extend into and through the base frame from one side of the base frame to and through an opposite side of the base frame, first and second ratcheting devices each mounted to the base frame, the first ratcheting device having a first handle and the second ratcheting device having a second handle, a first ratcheting web coupled at one end within the base frame to the first web and coupled at an opposite end to the first ratcheting device, the first ratcheting device responsive to ratcheting actuation of the first handle to draw the first ratcheting web therein, and a second ratcheting web coupled at one end within the base frame to the second web and coupled at an opposite end to the second ratcheting device, the second ratcheting device responsive to ratcheting actuation of the second handle to draw the second ratcheting web therein, wherein movement of the first and ratcheting webs into the first and second ratcheting device respectively draws the first and second webs further into the base frame and thereby tightens the first web about the first portion of the occupant and tightens the second web about the second portion of the occupant.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWING

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Figure 1A:
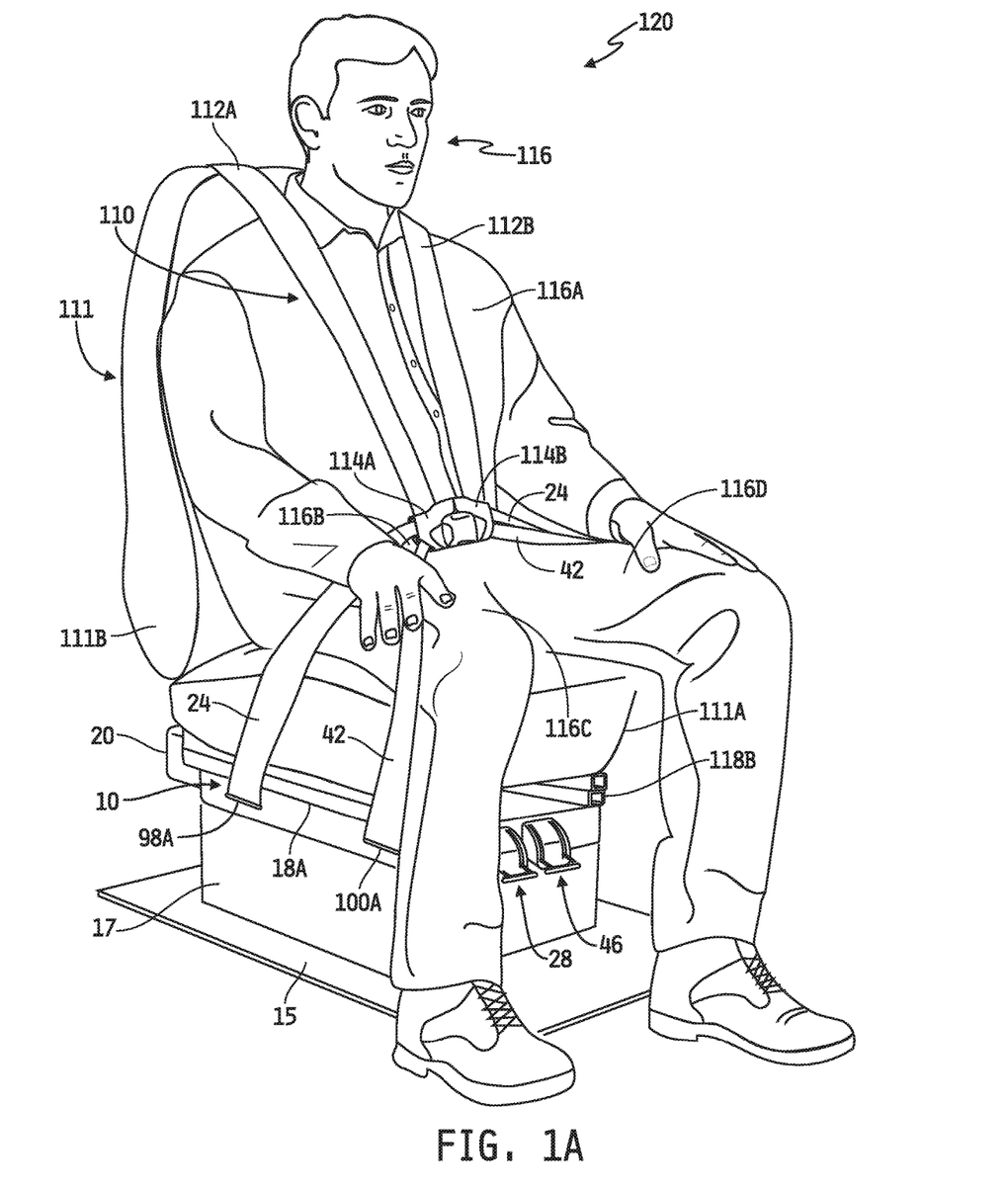
FIG. 1A is a front perspective view of an embodiment of a multi-point restraint system for a motor vehicle seat.
Figure 1B:
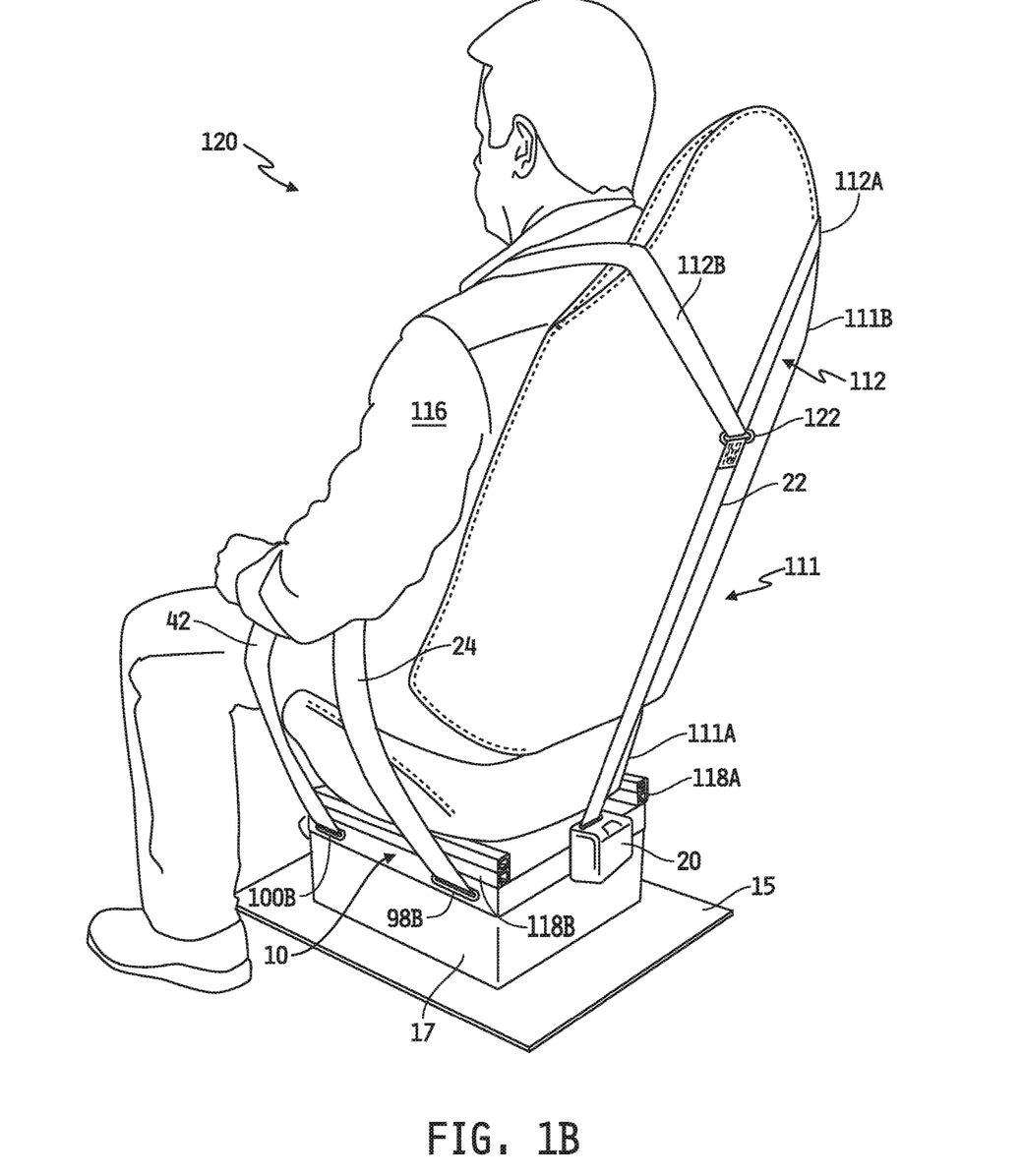
FIG. 1B is a rear perspective view of the multi-point motor vehicle seat restraint system illustrated in FIG. 1A.

Referring now to FIGS. 1A and 1B, an embodiment is shown of a multi-point motor vehicle seat restraint system 120. In the illustrated embodiment, the restraint system 120 includes a multi-point restraint harness 110 carried by a motor vehicle seat 111, and the motor vehicle seat 111 is illustratively mounted via an embodiment of a ratcheting web tightening apparatus 10 to a seat mounting base 17 which is mounted to a floor or floor frame 15 of a motor vehicle. In some embodiments, the motor vehicle seat 111 may be mounted to the seat mounting base 17 which is then mounted to the apparatus 110 and the apparatus 110 is, in turn, mounted to the floor or floor frame 15 of the motor vehicle. In still other embodiments, the seat mounting base 17 may be omitted and the motor vehicle seat 111 may be mounted to the apparatus 10 which is then mounted directly to the floor or floor frame 15 of the motor vehicle. In any case, the motor vehicle in which the restraint system 120 is mounted may illustratively be any motor vehicle configured to transport at least one vehicle operator and/or occupant, and examples include, but are not limited to, an off-road recreational vehicle such as an all-terrain vehicle (ATV), dune buggy or other off-road vehicle, an automobile, a light, medium or heavy-duty truck, an electric vehicle, a utility vehicle, a commercial vehicle, an industrial vehicle, a racing vehicle, and the like.

The vehicle seat 111 illustratively includes a seat bottom 111A coupled to a seat back 111B in a conventional manner. In the illustrated embodiment, the restraint system 110 coupled to the seat 111 is a 6-point restraint harness, and the embodiment of the ratcheting web tightening apparatus 10 is illustratively provides for selective adjustment, i.e., tightening and/or loosening, of four of the six points of securement. It will be understood, however, that the restraint system 110 may include more or fewer points of securement and/or that the ratcheting web tightening apparatus 10 may be modified to provide for selective adjustment of more or fewer points of securement. Those skilled in the art will recognize that any such modifications will involve mere mechanical steps in view of the concepts illustrated and described herein.

In the illustrated embodiment, the 6-point restraint harness 110 includes two shoulder webs 112A, 112B each configured to extend over a different shoulder of an occupant 116 of the seat 111, and to extend downwardly along either side of the torso 116A of the occupant 116 and coupled to a conventional tongue member 114A, in the case of the shoulder web 112A, and to a conventional buckle member 114B, in the case of the shoulder web 112B. In alternate embodiments, the positions of the tongue and buckle members 114A, 114B may be reversed, i.e., the shoulder web 112A may be coupled to a buckle member and the shoulder web 112B may be coupled to a tongue member. In any case, the shoulder webs 112A, 112B in the illustrated embodiment are provided in the form of a single web 112 coupled at the rear of the seat back 111B to one end of a connecting web 22, e.g., via a conventional web guide loop 122, and an opposite end of the connecting web 22 is operatively coupled to a conventional web retractor 20 coupled to the ratcheting web tightening apparatus 10 such that the connecting web 22 can be retracted within and paid out of the retractor 20 in a conventional manner. In some alternate embodiments, the retractor 20 may be coupled to the seat bottom 111A, to the seat back 111B and/or to the floor 15 or other support structure or surface within the motor vehicle. In other alternate embodiments, the shoulder webs 112A, 112B may be separate from each other with each coupled to a different web retractor attached to the apparatus 10, to the seat bottom 111A, to the seat back 111B and/or to the floor 15 or other support structure or surface within the motor vehicle. In still other alternative embodiments, the shoulder webs 112A, 112B, whether implemented as a single web or separate webs, may be attached directly to the apparatus 10, to the seat bottom 111A, to the seat back 111B and/or to the floor 15 or other support structure or surface within the motor vehicle.

Also coupled to the tongue and buckle members 114A, 114B are a lap web 24 and a thigh web 42. One end of the lap web 24 and one end of the thigh web 42 are illustratively coupled to the tongue member 114A, and opposite ends of the lap and thigh webs 24, 42 are coupled to the buckle member 114B. When the tongue and buckle members 114A, 114B are engaged, the lap web 24 illustratively engages the occupant 116 about the occupant's lap area 116B, and the thigh web 42 illustratively engages each of the occupant's thighs 116C, 116D. The tongue and buckle members 114A, 114B are illustratively configured, in a conventional manner, for releasable engagement with each other such that, when engaged, the shoulder webs 112A, 112B engage the torso 116A of the occupant, the lap web 24 engages the lap area 116B of the occupant 116, and the thigh web 42 engages each of the right and left thighs 116C, 116D respectively of the occupant 116, to restraint the occupant 116 in the vehicle seat 111. When the tongue and buckle members 114A, 114B are disengaged, the webs 112A, 112B, 24 and 42 may be manually separated from the occupant 116 to provide for ingress/egress of the occupant to/from the vehicle seat 111.

As will be described in detail below, the lap web 24 and the thigh web 42 are each illustratively implemented in the form of a single web, and each web 24, 42 extends into and through the ratcheting web tightening apparatus 10 at opposite sides thereof. Within the apparatus 10, each web 24, 42 is operatively coupled to one or the other of two web ratcheting devices 28, 46. The web ratcheting devices 28, 46 are each manually operable, in a conventional manner, to selectively adjust, e.g., tighten or loosen, the lap and thigh webs 24, 42 about the lap portion 116B and thighs 116C, 116D respectively of the occupant 116. After engaging the tongue and buckle members 114A, 114B, the restraint harness 110 can thus be selectively secured, i.e., tightened relative to, the occupant 116 of the motor vehicle seat 111 by ratcheting the web ratcheting devices 28, 46, and can be released from the occupant of the seat 111 by selectively manipulating the ratcheting devices 28, 46 to release the lap and thigh webs 24, 42 and then disengaging the tongue and buckle members 114A, 114B. The web ratcheting web tightening apparatus 10 thus simplifies tightening of the lap and thigh webs 24, 42 as compared with conventional multi-point restraint harnesses in which two or more of the restraint points are individually and separately adjustable via a dedicated, manually manipulated web tightening/loosening mechanism.

Figure 2:
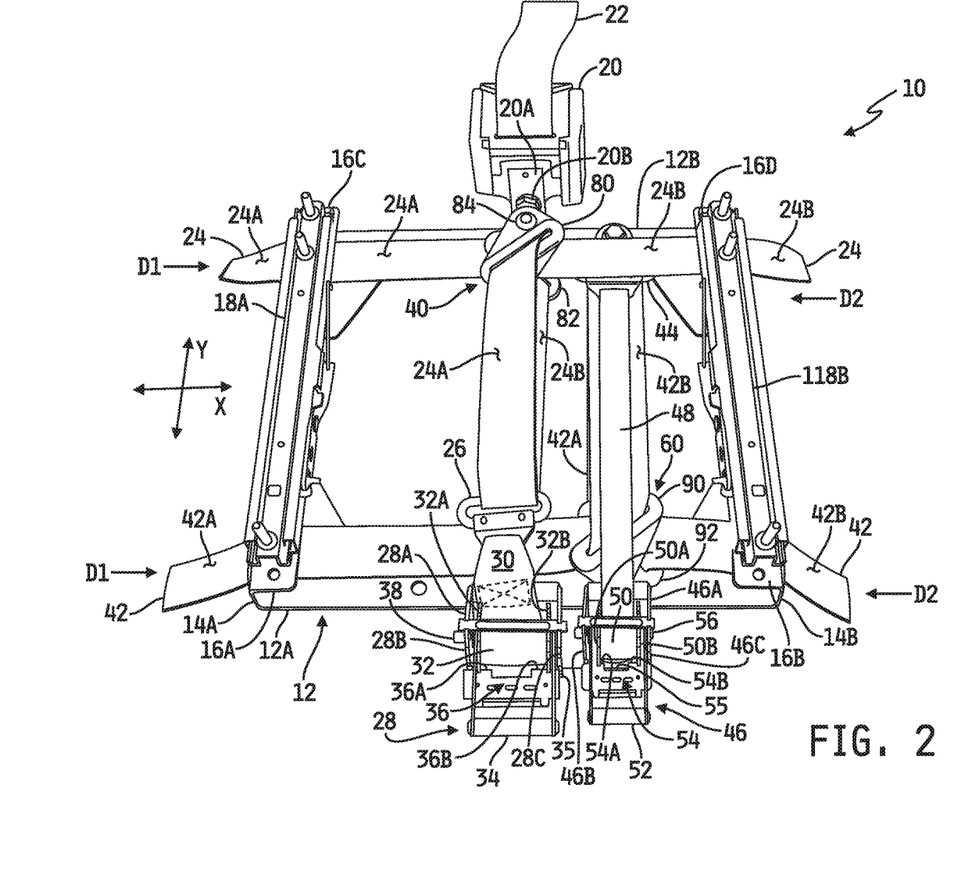
FIG. 2 is a top perspective view of an embodiment of the ratcheting web tightening apparatus illustrated in FIGS. 1A and 1B.
Figure 3:
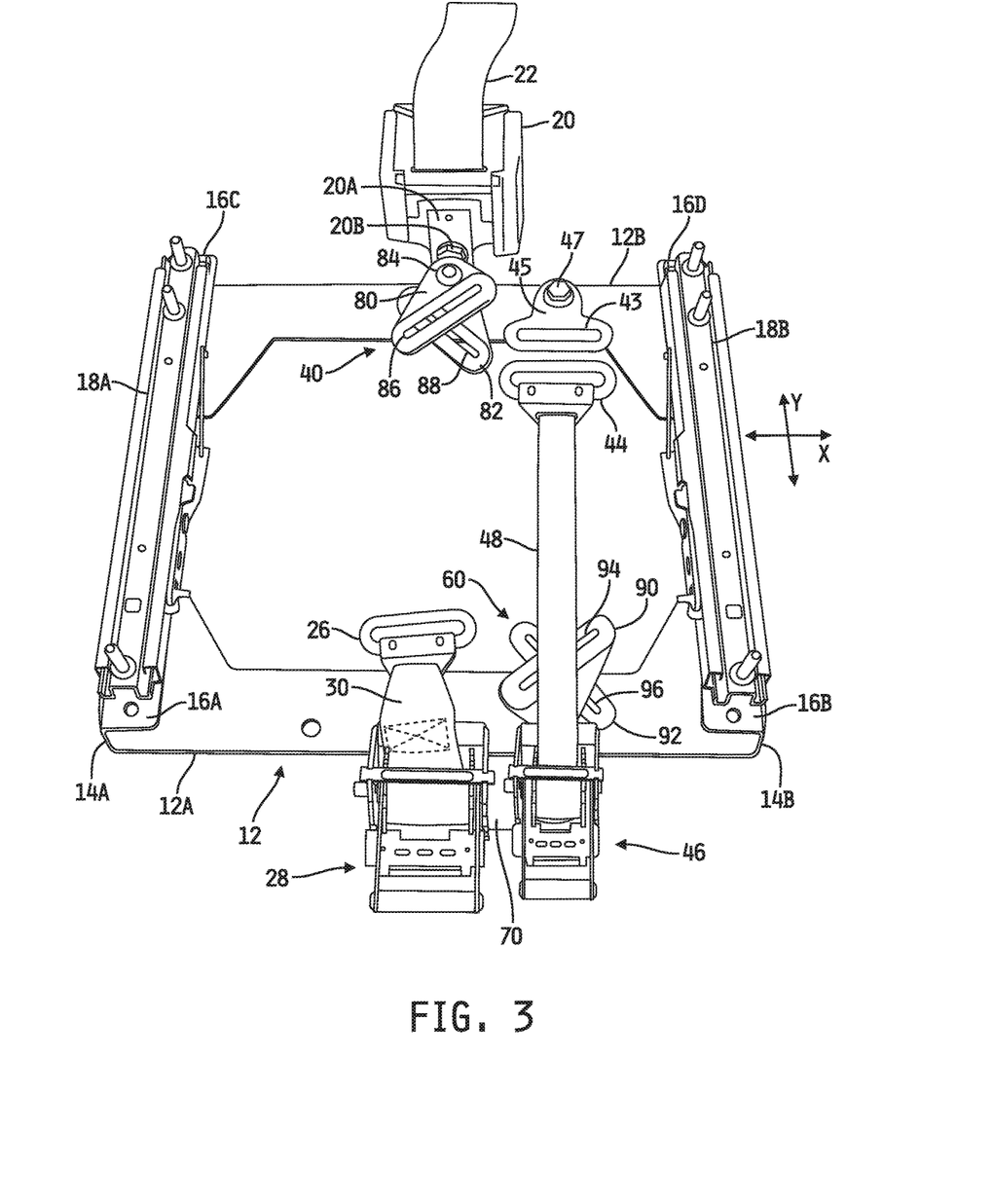
FIG. 3 is a top perspective view similar to FIG. 2, illustrating the ratcheting web tightening apparatus with the lap and thigh restraint webs removed therefrom.
Figure 4:
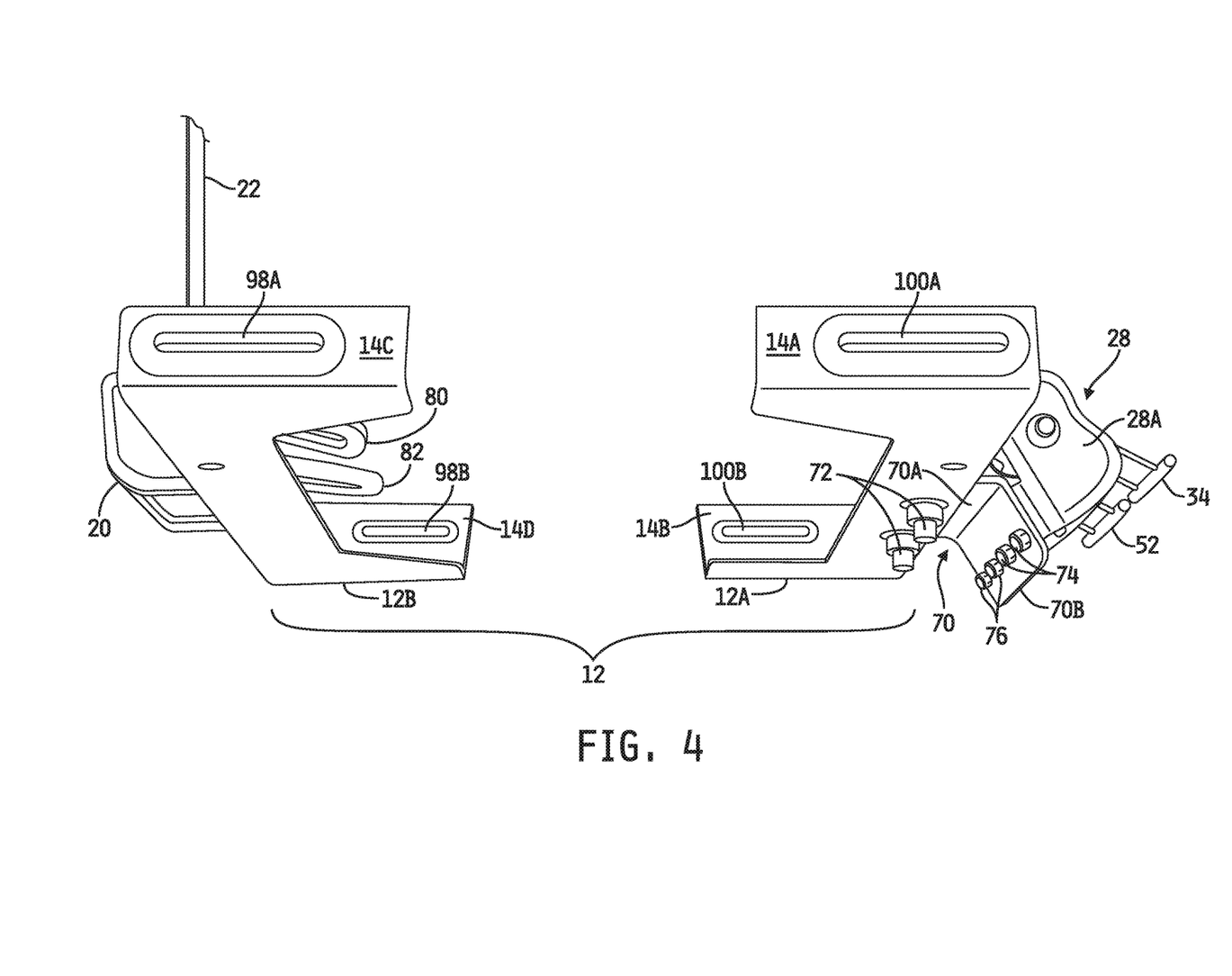
FIG. 4 is a side perspective view illustrating one of the sides of the ratcheting web tightening apparatus of FIGS. 2 and 3.

Referring now to FIGS. 2-4, an embodiment is shown of the ratcheting web tightening apparatus 10 illustrated in FIGS. 1A and 1B. The apparatus 10 illustratively includes a base frame 12 which, in addition to supporting and carrying the various components of the apparatus 10, serves as, and may replace, a conventional seat riser via which a vehicle seat 111 may be mounted to the seat mounting base 17 or to the floor or floor frame 15 of a motor vehicle. In the illustrated embodiment, the base frame 12 includes a forward base frame 12A and a rear base frame 12B each configured to be mounted to the seat mounting base 17 or to the floor, and/or floor framing, 15 of a motor vehicle. Opposing, upstanding outer sidewalls 14A, 14B each extend upwardly from opposite sides of, and at substantially right angles relative to, the forward base frame 12A, and each sidewall 14A, 14B has a top flange or lip 16A, 16B respectively extending therefrom at a substantially right angle with an outer edge of each flange 16A, 16B facing the outer edge of the other flange 16A, 16B. The rear base frame 12B is similarly constructed with sidewalls 14C, 14D and corresponding flanges or lips 16C, 16D.

A conventional vehicle seat guide or slide rail 18A is shown mounted to the flanges 16A, 16C, and another conventional vehicle seat guide or slide rail 18B is shown mounted to the flanges 16B, 16D. In the illustrated embodiment, providing the base frame 12 as a forward base frame 12A and a rear base frame 12B illustratively allows the spacing between the two frames 12A and 12B to be varied to accommodate different vehicle seat guide or slide rail attachment configurations. In some alternative embodiments, the base frame 12 may be provided in the form of a single base frame, and in other alternative embodiments the base frame 12 may be provided in the form of a left base frame and a right base frame, while in still further embodiments the base frame 12 may be provided in the form of more than two base frames, e.g., four base frames; one for each corner.

In the embodiment illustrated in FIGS. 2-4, the web retractor 20 is mounted substantially centrally to the rear base frame 12B via a bracket 20A and a conventional attachment member 20B, e.g., screw, bolt, bolt and nut combination, etc. The web retractor 20 has a retractable web 22 attached to a rotatable spool mounted therein, and the retractor 20 is operable in a conventional manner to draw the web 22 therein and pay out the web 22 as described above. In some embodiment, the retractor 20 may be a conventional locking retractor, such as an emergency locking retractor (ELR) or an automatic locking retractor (ALR), and in other embodiments the retractor 20 may be a non-locking retractor. In the illustrated embodiment, the single retractor 20 is intended to connect, via the single web 22 and, e.g., a conventional Y-connection, to each of the shoulder webs 112A, 112B forming part of the multi-point restraint harness 110. Alternatively, as described above, two retractors 20 may be mounted to the rear base frame 12B and spaced apart relative to each other such that each supplies web to only one of the shoulder webs 112A, 112B. In some alternate embodiments which the restraint harness does not include shoulder webs, the retractor 20 may be omitted in which case the shoulder webs 112A, 112B (or single shoulder web 112) may be affixed to the base frame 12B, seat base 111A, seat back 111B, floor 15 or other frame component of the motor vehicle, or may instead be coupled to one or more web retractors mounted to one or more suitable support structures within the motor vehicle. In other alternate embodiments, the retractor(s) 20 may be omitted, and the shoulder webs 112A, 112B, whether implemented as a single web or separate webs, may be attached directly to the apparatus 10, to the seat bottom 111A, to the seat back 111B and/or to the floor 15 or other support structure or surface within the motor vehicle.

The web tightening apparatus 10 illustrated in FIGS. 2-4 is configured to accommodate, i.e., to selectively adjust, e.g., by tightening and/or loosening, two separate webs 24 and 42 as briefly described above. Examples of two such webs 24, 42 in the context of the web-based restraint system 120 illustrated in FIGS. 1A and 1B will be described below, although it will be understood at the outset that no limitation on the function(s), implementation(s) or application(s) of the web 24 and/or of the web 42 in any web-based restraint implementation is intended or should be inferred. In the illustrated embodiment, the web 24 may be fed into and through the apparatus 10 via a web slot 98A formed through the sidewall 14C, and then out of the apparatus 10 via a web slot 98B formed through the sidewall 14D. For purposes of this disclosure, the path of the web 24 will be described as such. It will be understood, however, that the web 24 may alternatively be fed into and through the apparatus 10 via the web slot 98B, and then out of the apparatus 10 via the web slot 98A.

As most clearly shown in FIGS. 2 and 3, the apparatus 10 illustratively includes a web turning device 40 mounted to the rear base frame 12B via a conventional attachment member 84, e.g., e.g., screw, bolt, bolt and nut combination, etc., and a web turning loop 26. One end of a ratcheting web 30, separate from the web 24, is attached to the web turning loop 26, and the opposite end of the ratcheting web 30 is coupled to a ratcheting device 28 mounted to the forward or front base frame 12A. In the illustrated embodiment, the web turning device 40 illustratively includes a pair of web turning guides 80, 82, with the web turning guide 80 defining a web slot 86 therethrough and with the web turning guide 82 defining a web slot 88 therethrough. For purposes of this disclosure, the term "web turning device" illustratively refers to one or more structures which receive a web along a first direction and re-orient the web one or more times such that the web extends along a second direction different from the first direction. Such a web turning device, as this term is used herein, may directionally re-orient a web once or any number of times. The terms "web turning guide" and "web turning loop," as these terms are used herein, illustratively refer to structures which receive a web along a first direction and re-orient the web a single time such that the web extends along a second direction different from the first direction. As used in the context of this disclosure, for example, the web turning device 40 includes two web turning guides 80, 82, each of which directionally re-orients the web 24 a single time such that the web turning device 40 directionally reorients the web 24 twice.

The web turning guides 80, 82 are illustratively mounted together, e.g., one on top of the other, to the rear base frame 12B via a single attachment or fixation member 84 extending through the web turning guide 80, then through the web turning guide 82 and then through a bore defined through the rear base frame 12B. In some embodiments, a complementary fixation member engages the fixation member 84, and in other embodiments the fixation member 84 may engage the rear frame member 12B. In the illustrated embodiment, the slot 86 defined through the web turning guide 80 is illustratively oriented about 45 degrees relative to the X-axis illustrated in FIGS. 2 and 3 (i.e., the X-axis generally parallel with the width of the base frame 12A from the sidewall 14A to the sidewall 14B and with the width of the rear base frame 12B from the sidewall 14C to the sidewall 14D), and the slot 88 defined through the web turning guide 82 is illustratively oriented about 135 degrees relative to the illustrated X-axis illustrated in FIGS. 2 and 3. Each web turning guide 80, 82 is thus configured and arranged to redirect the web 24 in a direction approximately 90 degrees away relative to the direction in which the web 24 entered the respective web turning guide 80, 82, and to also turn the web over such that the top surface 24A of the web 24 exiting the web turning guide 80, 82 is the bottom surface 24B of the web 24 entering the web turning guide 80, 82. As illustrated most clearly in FIGS. 2 and 4, for example, the web 24 enters the apparatus 10 in the direction D1 via the web slot 98A with the top surface 24A of the web 24 facing upwardly. From the web slot 98A, the web 24 is fed from the left into the bottom of the slot 88 of the web turning guide 82, then forward from the top of the slot 88 of the web turning guide 82 to the web turning loop 26 such that the bottom surface 24B of the web 24 faces upwardly between the web turning guide 82 and the web turning loop 26. The web 24 is then fed through the bottom of the web turning loop 26, and then rearwardly from the top of the web turning loop 26 to the web turning guide 80 such that the top surface 24A of the web 24 again faces upwardly between the web turning loop 26 and the web turning guide 80. The web 24 is then fed through the top of the slot 86 of the web turning guide 80, then to the right from the bottom of the slot 86 of the web turning guide 80 toward and through the web slot 98B defined through the sidewall 14C of the rear base frame 12B such that the bottom surface 24B of the web faces upwardly between the web turning guide 80 and the web slot 98B, and the bottom surface 24B of the web 24 exiting outwardly from the web slot 98B likewise faces upwardly.

The ratcheting web 30 attached at one end to the web turning loop 26 is attached at its opposite end to a spool 32 of the ratcheting device 28. The spool 32 illustratively rotates about a spool shaft 38 which is rotatably mounted to a frame 28A of the ratcheting device 28. The ratcheting device 28 illustratively includes two toothed wheels or gears 32A, 32B each mounted to an opposite end of the spool 32 such that the wheels or gears 32A, 32B rotate with the spool 32, although it will be understood that in some alternate embodiments the ratcheting device 28 may include more or fewer such toothed wheels or gears. The spool 32 is illustratively biased, e.g., via one or more springs, to rotate in the web take-up direction, i.e., in the direction in which the ratcheting web 30 is wrapped about the spool 32.

A handle 34 is rotatably mounted to the frame 28A. In a ratcheting mode of the ratcheting device 28, the handle 34 may be manually rotated between first and second positions of the handle 34 relative to the frame 28A to cause the spool 32 to rotate in the web take-up direction to thereby wrap the ratcheting web 30 about the spool 32. Positions of the handle 34 between the second position and a third position define a web payout mode of the ratcheting device 28 during which the ratcheting web 30 may be paid out, i.e., drawn away from, the spool 32. The ratcheting and web payout modes of the ratcheting device 28 will be described below.

A ratchet pawl 36 is illustratively mounted to the handle 34. The ratchet pawl 36 is illustratively biased, e.g., via one or more springs, toward and against the frame 28A, but may be drawn away from the frame 28A by applying a force to the ratchet pawl 36 in a direction opposite to the frame 28A that is sufficient to overcome this bias. With the ratcheting device 28 in the ratcheting mode, i.e., with the handle 34 between the first and second positions thereof, a locking bar 35 is normally biased into engagement with the toothed wheels or gears 32A, 32B. With the locking bar 35 so engaged, the locking bar 35 blocks rotation of the spool 32 in the web payout direction. With the ratcheting device 28 in the ratcheting mode, i.e., with the handle 34 between the first and second positions thereof, and with the ratchet pawl 36 (normally) biased against the frame 28A, the tabs 36A, 36B of the ratchet pawl 36 are biased against the toothed wheels or gears 32A, 32B respectively. Illustratively, the teeth on each gear or wheel 32A, 32B are shaped such that the tabs 36A, 36B engage the toothed wheels or gears 32A, 32B between adjacent teeth while the locking bar 35 rides over the teeth without engaging the toothed wheels or gears 32A, 32B when the handle 34 is rotated upwardly from the first position toward the second position thereof, i.e., in the web take-up direction of the spool 32, and such that the locking bar 35 engages the toothed wheels or gears 32A, 32B between adjacent teeth while the tabs 36A, 36B ride over the teeth on each wheel or gear 32A, 32B without engaging the wheel or gears 32A, 32B when the handle 34 is rotated downwardly from the second position toward the first position thereof, i.e., in the web payout direction of the spool 32.

In the web ratcheting mode of the ratcheting device 28, the handle 34 is between the first and second positions thereof, the tabs 36A, 36B of the ratchet pawl 36 are biased against the toothed wheels or gears 32A, 32B and the locking bar 35 is likewise biased against the toothed wheels or gears 32A, 32B. As the handle 34 is rotated upwardly toward the vehicle seat 111 (i.e., toward the second position of the handle 34), the tabs 36A, 36B of the ratchet pawl 36 engage the toothed wheels or gears 32A, 32B and force the spool 32 to rotate in the web take-up direction as the locking bar 35 rides over the teeth of the wheels or gears 32A, 32B without engaging the wheels or gears 32A, 32B, thus drawing the web turning loop 26 toward the ratcheting device 28. When the direction of motion of the handle 34 is reversed, i.e., the handle 34 is rotated downwardly (toward the first position of the handle 34), the locking bar 35 engages the toothed wheels or gears 32A, 32B to prevent the spool 32 from rotating in the web pay-out direction while the tabs 36A, 36B of the ratchet pawl 36 ride along the teeth without engaging the wheels or gears 32A, 32B. In this manner, the ratcheting device 28 may be manually ratcheted in the web take-up direction of the spool 32 to thereby draw the web 24 into the apparatus 10 from each side thereof, i.e., in the directions D1 and D2 as illustrated in FIG. 2. As the ends of the web 24 are secured to tongue and buckle members 114A, 114B in the illustrated embodiment, such ratcheting of the ratcheting device 28 thus imparts tension on the web 24 and thereby selectively tightens the web 24 simultaneously about the lap portion 116B of the occupant 116 of the vehicle seat 111.

The ratcheting device 28 may be transitioned from the ratcheting mode just described to the web payout mode of the device 28 by drawing the ratchet pawl 36 away from the frame 28A, i.e., by applying a force to the ratchet pawl 36 in a direction opposite to the frame 28A that is sufficient to overcome the normal bias of the ratchet pawl 36 toward and against the frame 28A, and then rotating the handle 34 upwardly beyond the second position toward the third position thereof. The frame 28A and handle 34 are illustratively configured so that such rotation of the handle 34 from the second position toward the third position thereof releases or disengages the locking bar 35 from the toothed wheels or gears 32A, 32B, thereby allowing the spool 32 to be forcibly rotated in the web pay-out direction, e.g., by drawing the web 42 away from the apparatus 10, and thus pay out the ratcheting web 30 therefrom. At the third position of the handle 34 relative to the frame 28A, the frame 28A illustratively defines notches 28B, 28C therein which are sized to receive therein the tabs 36A, 36B of the locking pawl 36 and to hold the tabs 36A, 36B therein when the force overcoming the normal bias of the ratchet pawl 36 is removed from the ratchet pawl 36, i.e., when the ratchet pawl 36 is released. The third position of the handle 34 relative to the frame 28A effectively locks the ratcheting device 28 in the web pay-out mode in which the ratcheting web 30 may be drawn out of and away from the spool 30, i.e., by applying a force to the ratcheting web 30, e.g., via the lap web 24, sufficient to overcome the normal rotational bias of the spool 32 in the web take-up direction, to thereby selectively loosen the lap web 24 simultaneously from about the lap portion 116B of the occupant 116 of the vehicle seat 111. In the embodiment illustrated in FIGS. 2-4, the handle 34 is illustratively weighted such that, if not locked in the upright, web payout position just described, it drops forwardly and downwardly toward the first position of the handle 34, i.e., toward the floor 15 to which the seat 111 is mounted.

The thigh web 42 may be fed into and through the apparatus 10 via a web slot 100A formed through the sidewall 14A, and then out of the apparatus 10 via the web slot 100B formed through the sidewall 14B similarly as described with respect to the web 24. For purposes of this disclosure, the path of the web 42 will be described as such. It will be understood, however, that the web 42 may alternatively be fed into and through the apparatus 10 via the web slot 100B, and then out of the apparatus 10 via the web slot 100A.

The apparatus 10 illustratively includes another web turning device 60 mounted to the forward base frame 20A, a web turning guide 45 (see also FIG. 3) mounted to the rear base frame 20B, e.g., via a conventional attachment member 47, and another web turning loop 44 to which one end of another ratcheting web 48 is attached. The opposite end of the ratcheting web 48 is coupled via a spool 50 of another ratcheting device 46 mounted to the forward or front base frame 12A. In the illustrated embodiment, the turning device 60 illustratively includes a pair of web turning guides 90, 92, with the web turning guide 90 defining a web slot 94 therethrough and with the web turning guide 92 defining a web slot 96 therethrough. The web turning guides 90, 92 are illustratively mounted one on top of the other via a single fixation member (not shown) extending through the web turning guide 90, then through the web turning guide 92 and through a bore defined through the forward base frame 12A. The slot 94 defined through the web turning guide 90 is illustratively oriented about 45 degrees relative to the X-axis illustrated in FIGS. 2 and 3, and the slot 96 defined through the web turning guide 92 is illustratively oriented about 135 degrees relative to the illustrated X-axis. Like the web turning guides 80, 82, each web turning guide 90, 92 is thus configured and arranged to redirect the web 42 in a direction approximately 90 degrees away relative to the direction in which the web entered the web turning guide 90, 92, and to also turn the web over such that the top surface 42A of the web 42 entering the web turning guide 90 is the bottom surface of the web 42 entering the web turning guide 90, and that the top surface 42A of the web 42 entering the web turning guide 92 is the bottom surface of the web 42 exiting the web turning guide 92. The web turning guide 45 illustratively defines a slot 43 therethrough, and the slot 43 is illustratively oriented approximately parallel with the X-axis illustrated in FIGS. 2 and 3.

As illustrated most clearly in FIG. 2, and also with the aid of FIG. 3 to illustrate the web turning guide 45 and web turning loop 44, the web 42 entering the apparatus 10 in the direction D1 via the web slot 100A is fed from the left into the bottom of the slot 94 of the web turning guide 90, then rearward from the top of the slot 94 of the web turning guide 90 into the bottom of the web turning loop 44, and then from the top of the web turning loop 44 through the top of the web turning guide 45. From the bottom of the web turning guide 45, the web 42 is fed forward to and through the bottom of the slot 96 of the web turning guide 92, then to the right from the top of the slot 96 of the web turning guide 92 and then out of the apparatus 10 through the web slot 100B defined through the sidewall 14B of the forward base frame 12A.

The ratcheting web 48 attached at one end to the web turning loop 44 is attached at its opposite end to a spool 50 of the ratcheting device 46. The spool 50 illustratively rotates about a spool shaft 56 which is rotatably mounted to a frame 46A of the ratcheting device 46. The ratcheting device 46 illustratively includes two toothed wheels or gears 50A, 50B each mounted to an opposite end of the spool 50 such that the wheels or gears 50A, 50B rotate with the spool 50, although it will be understood that in some alternate embodiments the ratcheting device 46 may include more or fewer such toothed wheels or gears. The spool 50 is illustratively biased, e.g., via one or more springs, to rotate in the web take-up direction.

A handle 52 is rotatably mounted to the frame 46A. In a ratcheting mode of the ratcheting device 46, the handle 52 may be manually rotated between first and second positions of the handle 52 relative to the frame 46A to cause the spool 50 to rotate in the web take-up direction to thereby wrap the ratcheting web 48 about the spool 50. Positions of the handle 52 between the second position and a third position define a web payout mode of the ratcheting device 46 during which the ratcheting web 48 may be paid out, i.e., drawn away from, the spool 50. The ratcheting and web payout modes of the ratcheting device 46 will be described below.

A ratchet pawl 54 is illustratively mounted to the handle 52. The ratchet pawl 54 is illustratively biased, e.g., via one or more springs, toward and against the frame 46A, but may be drawn away from the frame 46A by applying a force to the ratchet pawl 54 in a direction opposite to the frame 46A that is sufficient to overcome this bias. With the ratcheting device 46 in the ratcheting mode, i.e., with the handle 52 between the first and second positions thereof, a locking bar 55 is normally biased into engagement with the toothed wheels or gears 50A, 50B. With the locking bar 55 so engaged, the locking bar 55 blocks rotation of the spool 50 in the web payout direction. With the ratcheting device 46 in the ratcheting mode, i.e., with the handle 52 between the first and second positions thereof, and with the ratchet pawl 54 (normally) biased against the frame 46A, the tabs 54A, 54B of the ratchet pawl 54 are biased against the toothed wheels or gears 50A, 50B respectively. Illustratively, the teeth on each gear or wheel 50A, 50B are shaped such that the tabs 54A, 54B engage the toothed wheels or gears 50A, 50B between adjacent teeth while the locking bar 55 rides over the teeth without engaging the toothed wheels or gears 50A, 50B when the handle 52 is rotated upwardly from the first position toward the second position thereof, i.e., in the web take-up direction of the spool 50, and such that the locking bar 55 engages the toothed wheels or gears 50A, 50B between adjacent teeth while the tabs 54A, 54B ride over the teeth on each wheel or gear 50A, 50B without engaging the wheel or gears 54A, 54B when the handle 52 is rotated downwardly from the second position toward the first position thereof, i.e., in the web payout direction of the spool 50.

In the web ratcheting mode of the ratcheting device 46, the handle is between the first and second positions thereof, the tabs 54A, 54B of the ratchet pawl 54 are biased against the toothed wheels or gears 50A, 50B and the locking bar 55 is likewise biased against the toothed wheels or gears 50A, 50B. As the handle 52 is rotated upwardly toward the vehicle seat 111 (i.e., toward the second position of the handle 52), the tabs 54A, 54B of the ratchet pawl 54 engage the toothed wheels or gears 50A, 50B and force the spool 50 to rotate in the web take-up direction as the locking bar 55 rides over the teeth of the wheels or gears 50A, 50B without engaging the wheels or gears 50A, 50B, thus drawing the web turning loop 44 toward the ratcheting device 46. When the direction of motion of the handle 52 is reversed, i.e., the handle 52 is rotated downwardly (toward the first position of the handle 52), the locking bar 55 engages the toothed wheels or gears 50A, 50B to prevent the spool 50 from rotating in the web pay-out direction while the tabs 54A, 54B of the ratchet pawl 54 ride along the teeth without engaging the wheels or gears 50A, 50B. In this manner, the ratcheting device 46 may be manually ratcheted in the web take-up direction of the spool 50 to thereby drawn the web 42 into the apparatus 10 from each side thereof, i.e., in the directions D1 and D2 as illustrated in FIG. 2. As the ends of the web 42 are secured to tongue and buckle members 114A, 114B in the illustrated embodiment, such ratcheting of the ratcheting device 46 thus imparts tension on the web 42 and thereby selectively tightens the web 42 simultaneously about the thighs 16C, 16D of the occupant 116 of the vehicle seat 111.

The ratcheting device 46 may be transitioned from the ratcheting mode just described to the web payout mode of the device 46 by drawing the ratchet pawl 54 away from the frame 46A, i.e., by applying a force to the ratchet pawl 54 in a direction opposite to the frame 46A that is sufficient to overcome the normal bias of the ratchet pawl 54 toward and against the frame 46A, and then rotating the handle 52 upwardly beyond the second position toward the third position thereof. The frame 46A and handle 52 are illustratively configured so that such rotation of the handle 52 from the second position toward the third position thereof releases or disengages the locking bar 55 from the toothed wheels or gears 50A, 50B, thereby allowing the spool 50 to be forcibly rotated in the web pay-out direction, e.g., by drawing the web 42 away from the apparatus 10, and thus pay out the ratcheting web 48 therefrom. At the third position of the handle 52 relative to the frame 46A, the frame 46A illustratively defines notches 46B, 46C therein which are sized to receive therein the tabs 54A, 54B of the locking pawl 54 and to hold the tabs 54A, 54B therein when the force overcoming the normal bias of the ratchet pawl 54 is removed from the ratchet pawl 54, i.e., when the ratchet pawl 54 is released. The third position of the handle 52 relative to the frame 46A effectively locks the ratcheting device 46 in the web pay-out mode in which the ratcheting web 48 may be drawn out of and away from the spool 50, i.e., by applying a force to the ratcheting web 48, e.g., via the thigh web 42, sufficient to overcome the normal rotational bias of the spool 50 in the web take-up direction, to thereby selectively loosen the web 42 simultaneously from about the thighs 16C, 16D of the occupant 116 of the vehicle seat 111. In the embodiment illustrated in FIGS. 2-4, the handle 52 is illustratively weighted such that, if not locked in the upright, web payout position just described, it drops forwardly and downwardly toward the first position of the handle 52, i.e., toward the floor 15 to which the seat 111 is mounted.

Referring now specifically to FIGS. 3 and 4, the apparatus 10 illustratively includes a bracket 70 for securing the ratcheting devices 28 and 46 to the front base frame 12A. In the illustrated embodiment, the bracket 70 illustratively includes a rear portion 70A mounted to the front base frame 12A and a front portion 70B to which the ratcheting devices 28, 46 are mounted. In the illustrated embodiment, the rear portion 70A and the front portion 70B of the bracket 70 form an oblique angle therebetween in order to suitably orient the ratcheting devices 28, 46, and in particular the handles 34, 52 of the ratcheting devices 28, 46, relative to the apparatus 10 and the vehicle seat 111 for easy access and operation of the ratcheting devices 28, 46 by the occupant 116 of the vehicle seat 111. In the illustrated embodiment, the ratcheting devices 34, 52 are secured to the front of the apparatus 10, e.g., to the front portion of the front base frame 12A so that the occupant 116 may easily access the handles 34, 52 of the ratcheting devices 28, 46 by reaching down along the front portion of the vehicle seat 111 to access the handles 34, 52 at the front portion of the apparatus 10. In some alternate embodiments, the ratcheting devices 28, 46 may instead be mounted to a front portion of the vehicle seat bottom 111A, to a front portion of the seat mounting base 17 or to the floor 15 of the motor vehicle adjacent to the front of the apparatus 10 or seat mounting base 17. In other alternate embodiments, the ratcheting devices 28, 46 may be instead mounted to or adjacent to one side or the other of the apparatus 10, seat bottom 111A, seat mounting base 17 or floor 15. In still other alternate embodiments, one of the ratcheting devices 28, 46 may be mounted to or adjacent to one side of the apparatus 10, seat bottom 111A, seat mounting base 17 or floor 15, and the other ratcheting device 28, 46 may be mounted to or adjacent to the other side or front of the apparatus 10, seat bottom 111A, seat mounting base 17 or floor 15.

In the illustrated embodiment, the ratcheting devices 28 and 46 are positioned side-by-side such that the handles 34 and 52 can be grasped and actuated together, i.e., simultaneously, with a single hand or can be actuated separately, e.g., with one hand or with two hands. In some alternate embodiments, the ratcheting devices 28, 46 and/or the handles 34, 52 may be spaced apart such that they cannot be grasped and actuated together with a single hand but may instead be separately actuatable, e.g., with one or two hands. In still other alternative embodiments, the handles 34, 52 may be coupled together, or a single handle may be configured to control both ratcheting devices 28, 46, so that both ratcheting devices 28, 46 operate together, i.e., simultaneously, via single actuator. Those skilled in the art will recognize other conventional structures and/or techniques for operating the ratcheting devices 28, 46 simultaneously or separately, and/or will recognize other suitable positioning of the ratcheting devices 28, 46 relative to the apparatus 10, seat mounting base 17, vehicle seat bottom 111A, vehicle seat back 111B and/or floor 15, and it will be understood that any such other conventional structures and/or techniques, and/or any other suitable positioning of the ratcheting devices 28, 46, are contemplated by this disclosure and are intended to fall within the scope of this disclosure.

Figure 5:
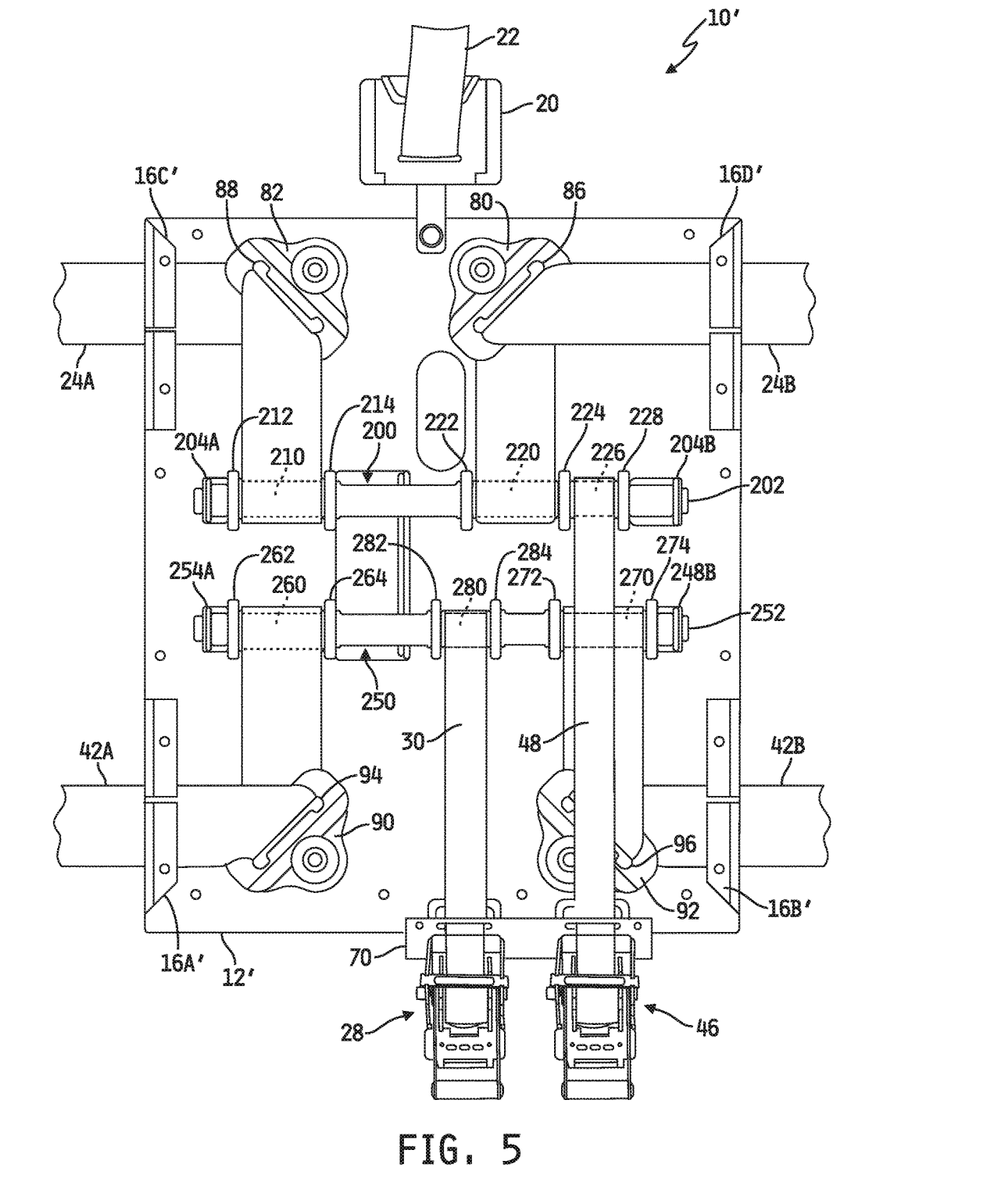
FIG. 5 is a top plan view of another embodiment of a ratcheting web tightening apparatus for a multi-point motor vehicle seat restraint system of the type illustrated in FIGS. 1A and 1B.
Figure 6:
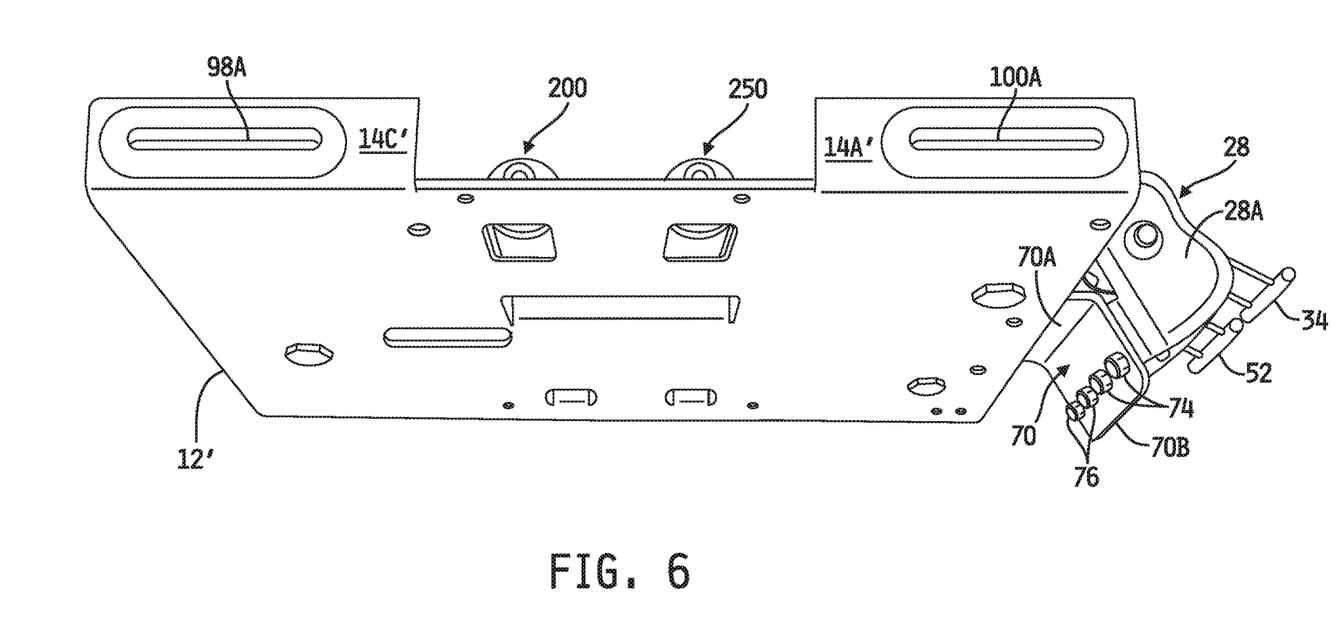
FIG. 6 is a side perspective view illustrating one of the sides of the ratcheting web tightening apparatus of FIG. 5.

Referring now to FIGS. 5 and 6, another embodiment of a ratcheting web tightening apparatus 10' is shown. The apparatus 10' is similar in some respects to the apparatus 10 illustrated in FIGS. 2-4, and like numbers are therefore used to represent like components. In the embodiment illustrated in FIGS. 5 and 6, the base frame 12' is illustratively a single frame member, although the frame 12' may alternatively be provided in two or more sections as described above with respect to the frame 12. In any case, the frame 12' defines four sets of flanges or lips 16A', 16B', 16C' and 16D' configured to be secured to vehicle seat guides or tracks such as the seat guides or tracks 18A, 18B illustrated in FIGS. 2 and 3. In the illustrated embodiment, the lap web 24 of the restraint harness 110 is provided in the form of two separate webs 24A and 24B, wherein the web 24A is coupled at one end to the tongue member 114A and the web 24B is coupled to the buckle member 114B. Likewise, the thigh web 42 is provided in the form of two separate webs 42A, 42B, wherein the web 42A is coupled at one end to the tongue member 114A and the web 42B is coupled to the buckle member 114B.

In the embodiment illustrated in FIGS. 5 and 6, the free end of the web 24A enters the apparatus 10' from the left through a slot 98A defined through a sidewall 14C' extending between the flange 16C' and the floor of the base frame 12', and then passes through the slot 88 of the web turning device 82 mounted to the frame 12', as described with respect to FIGS. 2-4, The free end of the web 24A is then attached to a region 210 of a spool 200 defined between two disks or lobes 212 and 214. The spool 200 is rotatably mounted via a rotatable shaft 202 between two brackets 204A, 204B secured to the base frame 12', and the web 24A may be taken up and paid out from the slot 98A via appropriate rotation of the spool 200 relative to the base frame 12'.

The free end of the web 24B enters the apparatus 10' from the right through a slot 98B (not shown but a mirror image of the slot 98A) defined through a sidewall extending between the flange 16D' and the floor of the base frame 12', and then passes through the slot 86 of the web turning device 80 mounted to the frame 12' separately from the web turning device 80. The free end of the web 24B is then attached to another region 220 of the spool 200 defined between two disks or lobes 222 and 224. As with the web 24A, the web 24B may be taken up and paid out from the slot 98B via appropriate rotation of the spool 200 relative to the base frame 12'. In one embodiment, the lengths of the webs 24A and 24B are identical so that rotation of the spool 200 in either direction has an identical effect on each of the tongue and buckle members 114A, 114B. In alternate embodiments, the lengths of the webs 24A, 24B may be different.

One end of the ratcheting web 48 is attached to yet another region 226 of the spool 200 defined between the disk or lobe 224 and another disk or lobe 228, and the opposite end of the ratcheting web 48 passes through the bracket 70 mounted to the front end of the base frame 12' and is attached to the spool of the ratcheting device 46 described in detail above with respect to FIGS. 2-4. Actuation of the ratcheting device 46 in the ratcheting mode, as described above, causes the ratcheting device 46 to draw the ratcheting web 48 therein which, in turn, causes the spool 200 to rotate in a direction which takes up the webs 24A and 24B, thereby simultaneously tightening the webs 24A, 24B of the restraint harness 110 against the lap region 116B of the occupant 116 of the vehicle seat 111. In the web payout mode of the ratcheting device 46, as described above, the ratcheting device 46 may be made to pay out the ratcheting web 48 by drawing out the web 24A and/or the web 24B from the apparatus 10' with a force greater than the biasing force on the spool of the ratcheting device 46 in the web take-up direction, which allows the force applied to the web 24A and/or to the web 24B to rotate the spool 200 in a direction which pays out the ratcheting web 48 from the ratcheting device 46 and which also pays out the webs 24A, 24B from the shaft 202.

The free end of the web 42A enters the apparatus 10' from the left through a slot 100A defined through a sidewall 14A' extending between the flange 16A' and the floor of the base frame 12', and then passes through the slot 94 of the web turning device 90 mounted to the forward portion of the frame 12', as described with respect to FIGS. 2-4. The free end of the web 42A is then attached to a region 260 of another spool 250 defined between two disks 262 and 264. The spool 250 is rotatably mounted via a rotatable shaft 252 between two brackets 254A, 254B secured to the base frame 12', and the web 42A may be taken up and paid out from the slot 100A via appropriate rotation of the spool 250 relative to the base frame 12'.

The free end of the web 42B enters the apparatus 10' from the right through a slot 100B (not shown but a mirror image of the slot 100A) defined through a sidewall extending between the flange 16B' and the floor of the base frame 12', and then passes through the slot 96 of the web turning device 92 mounted to the frame 12' separately from the web turning device 90. The free end of the web 42B is then attached to another region 270 of the spool 250 defined between two disks 272 and 274. As with the web 42A, the web 42B may be taken up and paid out from the slot 100B via appropriate rotation of the spool 250 relative to the base frame 12'. In one embodiment, the lengths of the webs 42A and 42B are identical so that rotation of the spool 250 in either direction has an identical effect on each of the tongue and buckle members 114A, 114B. In alternate embodiments, the lengths of the webs 42A, 42B may be different.

One end of the ratcheting web 30 is attached to yet another region 280 of the spool 250 defined between disks or lobes 282 and 284, and the opposite end of the ratcheting web 30 passes through the bracket 70 mounted to the front end of the base frame 12' and is attached to the spool of the ratcheting device 28 described in detail above with respect to FIGS. 2-4. Actuation of the ratcheting device 28 in the ratcheting mode, as described above, causes the ratcheting device 28 to draw the ratcheting web 30 therein which, in turn, causes the spool 250 to rotate in a direction which takes up the webs 42A and 42B, thereby simultaneously tightening the webs 42A, 42B of the restraint harness 110 against each thigh 116C, 116D of the occupant 116 of the vehicle seat 111. In the web payout mode of the ratcheting device 28, as described above, the ratcheting device 28 may be made to pay out the ratcheting web 30 by drawing out the web 42A and/or the web 42B from the apparatus 10' with a force greater than the biasing force on the spool of the ratcheting device 30 in the web take-up direction, which allows the force applied to the web 42A and/or to the web 42B to rotate the spool 250 in a direction which pays out the ratcheting web 30 from the ratcheting device 28 and which also pays out the webs 42A, 42B from the spool 250.

When combined with the restraint harness 110 illustrated in FIGS. 1A and 1B, the embodiment illustrated in FIGS. 5 and 6 differs functionally from the embodiment illustrated in FIGS. 2-4 only in that the lap web 24 is replaced with two lap webs 24A, 24B, the thigh web 42 is replaced with two thigh webs 42A, 42B, and the lap webs 24A, 24B are taken up and paid out via actuation of the ratcheting device 46 whereas the thigh webs 42A, 42B are taken up and paid out via actuation of the ratcheting device 28.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A web tightening apparatus for a multi-point occupant restraint harness carried by a motor vehicle seat mounted within a motor vehicle, the occupant restraint harness including a first web configured to extend at least partially about a first portion of the occupant, the web tightening apparatus comprising:
    a base frame configured to be mounted to at least two of a seat bottom of the motor vehicle seat, a seat mounting base and a floor of the motor vehicle,
    a first web turning guide mounted to and within the base frame, the first web of the multi-point occupant restraint harness extending into the base frame and through the first web turning guide within the base frame,
    a first ratcheting device mounted to the base frame and having a first handle, and
    a first ratcheting web coupled at one end within the base frame to the first web extending from the first web turning guide and coupled at an opposite end to the first ratcheting device, the first ratcheting device responsive to ratcheting actuation of the first handle to draw the first ratcheting web therein,
    wherein movement of the first ratcheting web into the first ratcheting device draws the first web further into the base frame and thereby tightens the first web about the first portion of the occupant.

2. The web tightening apparatus of claim 1, wherein the multi-point occupant restraint harness further includes a second web configured to extend at least partially about a second portion of the occupant, the web tightening apparatus further comprising:
    a second web turning guide mounted to and within the base frame, the second web of the multi-point occupant restraint harness extending into the base frame and through the second web turning guide within the base frame,
    a second ratcheting device mounted to the base frame and having a second handle, and
    a second ratcheting web coupled at one end within the base frame to the second web extending from the second web turning guide and coupled at an opposite end to the second ratcheting device, the second ratcheting device responsive to ratcheting actuation of the second handle to draw the second ratcheting web therein,
    wherein movement of the second ratcheting web into the second ratcheting device draws the second web further into the base frame and thereby tightens the second web about the second portion of the occupant.

3. The web tightening apparatus of claim 2, wherein the occupant restraint harness includes a tongue member and a buckle member each releasably engageable with the other,
    and wherein a first end of the first web is secured to one of the tongue member and the buckle member, and a second end of the first web extends into the base frame through a first slot defined through one side of the base frame, then through the first web turning guide within the base frame, and then out of the base frame from the first web turning guide via a second slot defined through an opposite side of the base frame, the second end of the first web extending out of the base frame being secured to the other of the tongue member and the buckle member, the first web coupled to the one end of the first ratcheting web within the base frame along a portion of the first web between the first web turning guide and the second slot,
    and wherein a first end of the second web is secured to one of the tongue member and the buckle member, and a second end of the second web extends into the base frame through a third slot defined through the one side of the base frame, then through the second web turning guide within the base frame, and then out of the base frame from the second web turning guide via a fourth slot defined through the opposite side of the base frame, the second end of the second web extending out of the base frame being secured to the other of the tongue member and the buckle member, the second web coupled to the one end of the second ratcheting web within the base frame along a portion of the second web between the second web turning guide and the fourth slot.

4. The web tightening apparatus of claim 3, further comprising a third web turning guide mounted to and within the base frame, the second web extending through the third web turning guide between the second web turning guide and the fourth slot, the second web coupled to the one end of the second ratcheting web within the base frame along a portion of the second web between the second web turning guide and the third web turning guide.

5. The web tightening apparatus of claim 4, further comprising a web turning loop attached to the one end of the second ratcheting web,
    wherein the second web is coupled to the one end of the second ratcheting web by extending through the web turning loop between the second and third web turning guides,
    and wherein the movement of the second ratcheting web into the second ratcheting device causes the web turning loop to pull the second web further into the base frame, thereby applying tension to the first and second ends of the second web.

6. The web tightening apparatus of claim 2, wherein the first and second ratcheting devices are mounted to the base frame with the first and second handles sufficiently proximate to each other to allow single-handed, simultaneous ratcheting actuation thereof.

7. The web tightening apparatus of claim 1, wherein the first web comprises at least part of a lap web of the occupant restraint harness configured to extend about and engage a lap portion of the occupant, and wherein the second web comprises at least part of a thigh web of the occupant restraint harness configured to extend about and engage a portion of each thigh of the occupant.

8. The web tightening apparatus of claim 1, wherein the occupant restraint harness includes a tongue member and a buckle member each releasably engageable with the other, and wherein a first end of the first web is secured to one of the tongue member and the buckle member, and a second end of the first web extends into the base frame through a first slot defined through one side of the base frame, then through the first web turning guide within the base frame, and then out of the base frame from the first web turning guide via a second slot defined through an opposite side of the base frame, the second end of the first web extending out of the base frame being secured to the other of the tongue member and the buckle member, the first web coupled to the one end of the first ratcheting web within the base frame along a portion of the first web between the first web turning guide and the second slot.

9. The web tightening apparatus of claim 8, further comprising a second web turning guide mounted to and within the base frame, the first web extending through the second web turning guide between the first web turning guide and the second slot, the first web coupled to the one end of the first ratcheting web within the base frame along a portion of the first web between the first web turning guide and the second web turning guide.

10. The web tightening apparatus of claim 9, further comprising a web turning loop attached to the one end of the first ratcheting web,
wherein the first web is coupled to the one end of the first ratcheting web by extending through the web turning loop between the first and second web turning guides,
and wherein the movement of the first ratcheting web into the first ratcheting device causes the web turning loop to pull the first web further into the base frame, thereby applying tension to the first and second ends of the first web.

11. The web tightening apparatus of claim 1, further comprising a first spool rotatably mounted to and within the base frame,
wherein one end of the first web is attached to the occupant restraint harness and an opposite end of the first web extends into the base frame and through the first web turning guide into attachment with a first region of the first spool,
and wherein the one end of the first ratcheting web is attached to a second region of the first spool, the one end of the first ratcheting web being coupled to the first web via the first spool,
and wherein the movement of the first ratcheting web into the first ratcheting device rotates the first spool in a direction which takes up the first web on the first region of the first spool.

12. The web tightening apparatus of claim 11, wherein the occupant restraint harness further includes a second web having one end attached to the occupant restraint harness and an opposite end, the second web configured to extend at least partially about a second portion of the occupant,
the web tightening apparatus further comprising a second web turning guide mounted to and within the base frame, the opposite end of the second web of the occupant restraint harness extending into the base frame, through the second web turning guide within the base frame and into attachment with a third region of the first spool,
and wherein rotation of the first spool by the movement of the first ratcheting web into the first ratcheting device takes up the second web on the third region of the first spool.

13. The web tightening apparatus of claim 12 wherein the first and second portions of the occupant together define a lap area of the occupant,
and wherein the first and second webs together form a lap web extending about the lap area of the occupant.

14. The web tightening apparatus of claim 12, wherein the first portion of the occupant is a first thigh of the occupant and the second portion of the occupant is a second thigh of the occupant,
and wherein the first web extends about the first thigh of the occupant and the second web extends about the second thigh of the occupant.

15. The web tightening apparatus of claim 1, wherein the occupant restraint harness further includes a second web having one end attached to the occupant restraint harness and an opposite end, the second web configured to extend at least partially about a second portion of the occupant,
the web tightening apparatus further comprising:
a second spool rotatably mounted to and within the base frame,
a second web turning guide mounted to and within the base frame, the opposite end of the second web of the occupant restraint harness extending into the base frame, through the second web turning guide within the base frame and into attachment with a first region of the second spool,
a second ratcheting device mounted to the base frame and having a second handle, and
a second ratcheting web attached at one end to a second region of the second spool and coupled at an opposite end to the second ratcheting device, the second ratcheting device responsive to ratcheting actuation of the second handle to draw the second ratcheting web therein, wherein the movement of the second ratcheting web into the second ratcheting device rotates the second spool in a direction which takes up the second web on the first region of the second spool.

16. The web tightening apparatus of claim 15, wherein the wherein the first portion of the occupant together is a lap area of the occupant and a second portion of the occupant is at least one thigh of the occupant,
and wherein the first web is or is part of a lap web extending about the lap area of the occupant and the second web is a thigh web extending about the at least one thigh of the occupant.

17. A web tightening apparatus for a multi-point occupant restraint harness carried by a motor vehicle seat mounted within a motor vehicle, the occupant restraint harness including a first web attached at opposite ends thereof to the occupant restraint harness, the first web configured to extend about a first portion of the occupant, the web tightening apparatus comprising:
a base frame configured to be mounted to at least two of a seat bottom of the motor vehicle seat, a seat mounting base and a floor of the motor vehicle, wherein a portion of the first web between the opposite ends thereof extends into the base frame through a first slot defined on one side thereof and extends out of the base frame through a second slot defined on an opposite side thereof, a first ratcheting device mounted to the base frame and having a first handle, and a first ratcheting web coupled at one end within the base frame to the first web and coupled at an opposite end to the first ratcheting device, the first ratcheting device responsive to ratcheting actuation of the first handle to draw the first ratcheting web therein, wherein movement of the first ratcheting web into the first ratcheting device draws the first web further into the base frame and thereby tightens the first web about the first portion of the occupant.

18. The web tightening apparatus of claim 17, further comprising a web turning loop attached to the one end of the first ratcheting web, wherein the first web is coupled to the one end of the first ratcheting web by extension of the first web through the web turning loop between the first and second slots, and wherein the movement of the first ratcheting web into the first ratcheting device causes the web turning loop to pull the first web further into the base frame, thereby applying tension to the opposite ends of the first web.

19. A web tightening apparatus for a multi-point occupant restraint harness carried by a motor vehicle seat mounted within a motor vehicle, the occupant restraint harness including first and second webs each attached at opposite ends thereof to the occupant restraint harness, the first web configured to extend about a first portion of the occupant and the second web configured to extend about a second portion of the occupant, the web tightening apparatus comprising:

a base frame configured to be mounted between a seat bottom of the motor vehicle seat and a floor of the motor vehicle, wherein a portion of each of the first and second webs extend into and through the base frame from one side of the base frame to and through an opposite side of the base frame, first and second ratcheting devices each mounted to the base frame, the first ratcheting device having a first handle and the second ratcheting device having a second handle, a first ratcheting web coupled at one end within the base frame to the first web and coupled at an opposite end to the first ratcheting device, the first ratcheting device responsive to ratcheting actuation of the first handle to draw the first ratcheting web therein, and a second ratcheting web coupled at one end within the base frame to the second web and coupled at an opposite end to the second ratcheting device, the second ratcheting device responsive to ratcheting actuation of the second handle to draw the second ratcheting web therein, wherein movement of the first and ratcheting webs into the first and second ratcheting device respectively draws the first and second webs further into the base frame and thereby tightens the first web about the first portion of the occupant and tightens the second web about the second portion of the occupant.

20. The web tightening apparatus of claim 19, wherein the first and second ratcheting devices are mounted to the base frame side-by-side with the first and second handles sufficiently proximate to each other to allow single-handed, simultaneous ratcheting actuation of the first and second ratcheting devices.

* * * * *